(12) United States Patent
Bertolini (10) Patent No.: US 9,778,533 B2
(45) Date of Patent: Oct. 3, 2017

(54) WINDOW CONSTRUCTION

(71) Applicant: ISOCLIMA S.p.A, Este (IT)

(72) Inventor: Alberto Bertolini, Este (IT)

(73) Assignee: ISOCLIMA S.p.A., Este (IT)

( * ) Notice: Subject to any disclaimer, the term of this patent is extended or adjusted under 35 U.S.C. 154(b) by 0 days.

(21) Appl. No.: 14/766,109

(22) PCT Filed: Mar. 27, 2013

(86) PCT No.: PCT/EP2013/000939
§ 371 (c)(1),
(2) Date: Aug. 5, 2015

(87) PCT Pub. No.: WO2014/121809
PCT Pub. Date: Aug. 14, 2014

(65) Prior Publication Data
US 2015/0370140 A1    Dec. 24, 2015

(30) Foreign Application Priority Data
Feb. 6, 2013 (EP) .................................... 13425023

(51) Int. Cl.
*G02F 1/153* (2006.01)
*G02F 1/163* (2006.01)
(Continued)

(52) U.S. Cl.
CPC ........ *G02F 1/163* (2013.01); *B32B 17/10036* (2013.01); *B32B 17/10055* (2013.01); *B32B 17/1077* (2013.01); *B32B 17/10495* (2013.01); *B32B 17/10761* (2013.01); *B32B 17/10788* (2013.01); *B60J 1/001* (2013.01); *B60J 3/04* (2013.01); *B61D 25/00* (2013.01);
(Continued)

(58) Field of Classification Search
CPC .......... G02F 1/161; G02F 1/163; G02F 1/155; B32B 17/10761; B32B 17/10788; B32B 17/10055; B32B 17/1077; B32B 17/10495; B32B 17/10036; E06B 3/6722; B60J 1/001; B60J 3/04
USPC ................................... 359/265–275; 345/105
See application file for complete search history.

(56) References Cited

U.S. PATENT DOCUMENTS 5,589,958 A * 12/1996 Lieb ........................ A47F 3/007
                                                                    312/114
8,064,120 B2 * 11/2011 Callahan ............... B64C 1/1484
                                                                    359/275
(Continued)

FOREIGN PATENT DOCUMENTS

| DE | 19814094 A1 | 10/1999 |
| DE | 102010048097 A1 | 4/2012 |
| WO | 2010032067 A1 | 3/2010 |

OTHER PUBLICATIONS

International Search Report and Written Opinion for PCT/EP2013/000939 mailed Aug. 8, 2013.

*Primary Examiner* — Tuyen Tra
(74) *Attorney, Agent, or Firm* — Hauptman Ham, LLP (57) ABSTRACT

The present invention refers to a window construction, particularly to be used in a train, vehicle, car, helicopter, aircraft or building, which comprises a laminated window glazing having electrically switchable layer means arranged in a laminate, and controlling means being coupled to the switchable layer means for controlling the sunlight transparency of the switchable layer means.

12 Claims, 8 Drawing Sheets

(51) Int. Cl.
| | |
|---|---|
| *B32B 17/10* | (2006.01) |
| *B61D 25/00* | (2006.01) |
| *B60J 3/04* | (2006.01) |
| *B60J 1/00* | (2006.01) |
| *G02F 1/155* | (2006.01) |
| *E06B 3/67* | (2006.01) |
| *G02F 1/161* | (2006.01) |

(52) U.S. Cl.
CPC ............ *E06B 3/6722* (2013.01); *G02F 1/155* (2013.01); *G02F 1/161* (2013.01)

(56) References Cited

U.S. PATENT DOCUMENTS

| | | | |
|---|---|---|---|
| 8,310,839 B2* | 11/2012 | Arione | H03K 17/962 |
| | | | 200/512 |
| 8,482,834 B2* | 7/2013 | Cordova | B60J 3/04 |
| | | | 359/228 |
| 2004/0160538 A1* | 8/2004 | Li | C09K 19/544 |
| | | | 349/16 |
| 2005/0001456 A1 | 1/2005 | Bohm et al. | |
| 2005/0231336 A1 | 10/2005 | Strohband et al. | |
| 2008/0231934 A1 | 9/2008 | Knafou et al. | |
| 2012/0147449 A1* | 6/2012 | Bhatnagar | B32B 17/10055 |
| | | | 359/275 |
| 2012/0307337 A1 | 12/2012 | Bartug et al. | |
| 2016/0154290 A1* | 6/2016 | Brown | G02F 1/163 |
| | | | 359/275 |

\* cited by examiner

WINDOW CONSTRUCTION

RELATED APPLICATIONS

The present application is a National Phase of International Application Number PCT/EP2013/000939, filed Mar. 27, 2013, and claims priority from European Application 13425023.2, filed Feb. 6, 2013.

The present invention relates to a window construction, particularly used in a vehicle like a train, car or ship, but also in a building.

Usually, for instance, in the passenger compartments of trains, the window of the compartment is provided with a curtain or roller blind or something similar to be able to darken the compartment to protect the passengers in the compartment against too much sunlight. These known blinds are operated directly by hand or they are driven by means of an electromotor, and, therefore, the blinds are subjected to frequent maintenance and repair.

It is, therefore, an object of the present invention to provide a window construction avoiding frequent maintenance and repair of the blinds.

This object is solved by the window construction of claim 1. Accordingly, the window construction or window of the invention, which can be used in a vehicle like a train, car or ship, but also in a building, comprises a laminated window glazing having electrically switchable layer means, and controlling means being coupled to the switchable layer means for controlling the transparency of visible light or sun light of the switchable layer means and, therefore, also of the whole window. The window construction of the invention is very reliable since it avoids the mechanical or electromechanical drives and blinds of the state of the art.

Generally, the window construction of the invention allows darkening the whole window or only a part of the window. Further, the darkening of the window can be controlled in selected fields or segments of the window of the invention.

The window construction also can be arranged according to be in a normally darkened state which means that the window is normally in a darkened state which can be changed by controlling into a transparent state of the whole or of a part of the window within selected and controlled segments or fields of the window. In alternative, the window construction can be arranged to be in a normally transparent state which means that the window is normally in a transparent state which can be changed by the controlling means into a darkened state of the whole or of a part of the window within selected and controlled segments or fields of the window.

The window construction can also be arranged to control the darkening or the transparency of the window gradually or stepwise using a variable dimming or variation control to be effective within the whole window or in a part of the window within selected segments or fields.

In a preferred embodiment of the invention, the controlling means or electronics are arranged on or within the window glazing to obtain an integration of the window glazing and the control. Accordingly, the window of the invention has a compact structure saving space in the passenger compartment. Further, since the window of the invention is an integrated unit, this facilitates replacing the original windows with new windows corresponding to the invention in order to upgrade the windows of the vehicle or train.

The controlling means may comprise a display for indicating the presently adjusted or switched status of transparency or darkening of the switchable layer means or switchable film.

According to a preferred embodiment of the invention, the controlling means comprises a switch or switching system to be operated by a person or passenger for controlling the transparency or darkening of the window glazing or switchable layer means.

A touch sensitive system like, for instance, a touch screen or a touch panel or touch pad can be used for realizing the switching function and/or the display function of the control box to offer a convenient method for blinding or darkening down and a number of possible adjustments of the transparency of the glazing from natural bright light to substantially complete non-transparent glazing. Preferably, the touch sensitive system or touch screen or touch sensitive panel is arranged inside the vehicle or passenger compartment to be easily accessible for the passenger, particularly for the hands or fingers of the person who wants to manipulate or control the transparency of the window.

The display function of the transparency status or darkening status of the window can be installed by a LCD device, LEDs, a series of lights, or by the touch screen as mentioned.

Preferably, the touch screen is arranged on an inner pane of the window glazing directed to inside of a vehicle or train or building again to be easily accessible for operation by a passenger. Due to the same reasons, the touch screen can provide a touch sensitive area arranged on the inner pane or inserted therein.

The controlling means may comprise a controlling unit or controlling interface coupled to the touch sensitive system or touch screen, the switchable layer means or electrochromic film of the window glazing, and to an electrical power or voltage supply to be able to carry out the electrical control of the window of the invention.

The electrical power supply provides the electrical energy or voltages for supporting the controlling means of the window construction of the invention. Accordingly, the power supply is constructed to provide DC and/or AC voltage to drive the touch sensitive system, a controlling unit, and the switchable layer means of the window of the invention. Generally, the power supply can provide the direct voltage of 12 V of a car battery, 28 V of VAN battery, 24 V of a train compartment power supply, 28 V of a helicopter or an aircraft power supply or an alternating voltage of 110 or 220 V of a power network, or a voltage value there between.

Preferably, the controlling unit is arranged on or within the window glazing to obtain a compact integrated structure of the inventive window.

A first wiring for electrical coupling the touch sensitive system or touch screen to the controlling unit can be provided wherein the first wiring is arranged on or within the window glazing of the window construction of the invention in order to further increase the integration of the window. The window construction can comprise a second wiring for electrical coupling the controlling unit to the switchable layer means wherein the second wiring can be arranged again on or within the window glazing again to increase the degree of integration of the window of the invention.

Preferably, the controlling unit comprises only one connector to be visible from outside for coupling to a voltage supply or supply line.

In a preferred embodiment of the invention, the window glazing comprises a wiring layer having the first and second wirings or electrical lines and conductors formed therein to obtain a better integration and a very reliable connection of the components. The touch sensitive system or touch screen can have a wiring and electrode panel that is formed in this wiring layer to allow mass production of the windows.

In a preferred construction, the laminated window comprises panes made of glass or plastic, for instance, polycarbonate, and adhesive interlayers made of an adhesive foil, particularly a polyvinylbutyral or polyurethane foil, and the electrical switching layer means comprises at least a first electrode layer, a second electrode layer, and an electrochromic layer arranged between the first and second electrode layers wherein the electrode layers are coupled to a controlling unit of the controlling means to allow a lamination process with high mechanical resistance.

The first electrode or controlling electrode can be portioned or divided into a plurality of separate electrode fields or segments which are separately and independently controllable electrically, wherein the second electrode layer is the common electrode coupled to electrical mass potential. This structure allows darkening or adjusting of transparency of selected fields and areas of the window as wished by a passenger. Preferably, the fields or segments of the first electrode layer can be arranged in parallel stripes.

The electrode fields and segments and corresponding darkening fields or segments of the window can be vertically or horizontally arranged to be able to realize different applications. The width of the stripes or bands of the darkening or transparency segments can be equal or different.

The touch sensitive system or panel or touch screen can comprise a printed structure or circuit to allow mass production. The printed structure can be provided by using, for instance, a silver paste or graphite paste in a printing method.

The window construction of the invention can have a window glazing with an air gap or insulating space like in an insulating window which is defined by two parallel panes made of glass or plastic, and a spacer or insulating profile circumferentially extending in the form of a frame between the panes in order to realize the window construction as a laminated insulating window which can be used in a plurality of applications in which insulating against deep temperatures is important, for instance, in trains.

The switchable layer means or film and the touch sensitive panel or touch screen may be arranged within the same plane of layers to save space.

A controlling unit of the controlling means can be installed in a free space between the panes of the window glazing to protect the unit against adverse influences of weather.

Further advantageous embodiments of the invention are mentioned in the dependent claims. Further advantages, advantageous embodiments, and features of the invention are mentioned in the following description of preferred and exemplified embodiments of the invention in connection with the drawings that show:

Figures 1, 2:
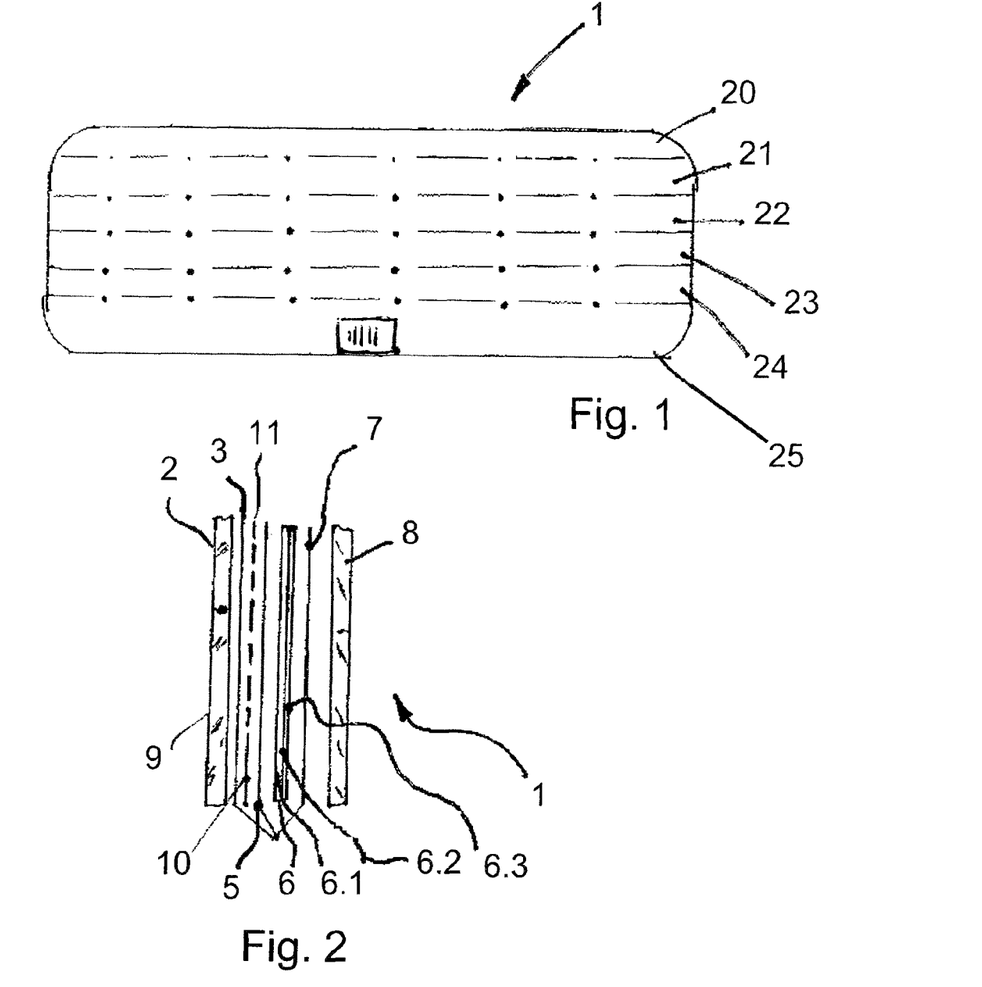
FIG. 1 a schematic view of a preferred embodiment of the invention comprising a touch screen and several electrode fields corresponding to respective darkening fields.
FIG. 2 a schematic cross section view of the laminated and layered structure of the preferred embodiment of the invention according to FIG. 1.
Figure 3:
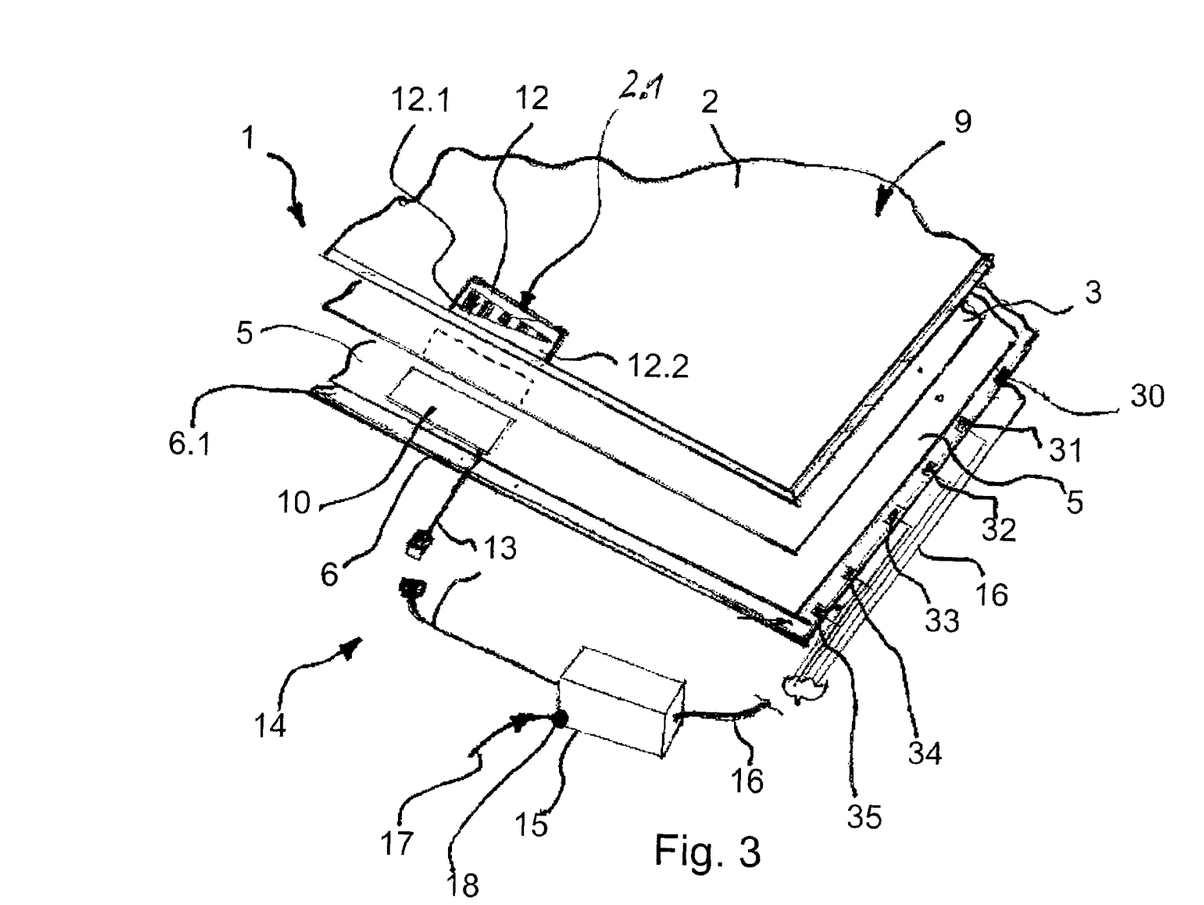
FIG. 3 a schematic perspective and explosive view in part of the preferred window construction of the invention according to FIG. 2.

FIGS. 1, 2 and 3 show a window construction 1 according to a preferred embodiment of the present invention. The window construction 1 has the usual shape of a rectangular window and it can be used, preferably, in a train, but also in another vehicle like a car, ship, helicopter or aircraft, or even in a building. It is formed in an integrated laminate with a plurality of layers and panes.

FIG. 2 shows a schematic cross section in part of the window construction 1 in an explosive manner. The window construction comprises a laminated and integrated window glazing 9 that comprises an inner pane 2 made of glass or plastic like, for instance, polycarbonate (=PC), the inner pane 2 is directed to inside of a train or passenger compartment, an interlayer 3 being adhesive and made, for instance, of polyvinylbutyral (=PVB) or a PVB foil, a polyurethane (=PU) foil or an ethylene vinyl acetate (=EVA) foil, a touch screen electrode layer 10 of a touch screen 12 or touch sensitive system or panel, optionally, a wiring layer 11 with electrical lines, conductors, and/or contacts, wherein the touch screen electrode layer 10 and the wiring layer 11 can be integrated in the same layer, electrically switchable layer means 6 or a switchable film having an inner electrode layer 6.1, an electrochromic layer 6.2, and an outer electrode layer 6.3, a further adhesive interlayer 7 made of PVB, PU or EVA, and an outer pane 8 made of glass or plastic like PC or PMMA (=polymethylmethacrylate) or hard polyurethane which is directed to outside of the train or vehicle in which the window construction 1 is used.

The electrochromic layer 6.2 comprises an acrylic or epoxy type resin in which droplets containing liquid crystals or bipolar particles suitable to absorb or scatter the light are dispersed. If a voltage is supplied to the electrode layers 6.1 and 6.3, the droplets or particles can be aligned to make the electrochromic layer 6.2 transparent or to change its transparency and light from the outside can pass through the window. If the electrical voltage is removed the droplets or particles return again to the original or normal random state causing the light to be absorbed or reflected by the droplets or particles within the electrochromic layer 6.1 resulting in a darkening. Accordingly, the electrochromic layer 6.1 is in a normally darkened state without any voltage supplied. The higher the voltage supplied at the electrode layers 6.1 and 6.3 the higher is the transparency of the electrochromic layer 6.2 since more and more particles or droplets are aligned for passing light if the voltage increases. Accordingly, by variation of the voltage level the transparency level can be changed. DE 10 2008 030 441 B3, for instance, describes an electrically switchable layer means 6 in more detail which can be used in the present invention. The electrode layers 6.1 and 6.3 can be made of ITO (indium tin oxide).

Further, the window construction 1 comprises controlling means 14 that are coupled to the switchable layer means 6 of the window glazing 9 for controlling the sunlight transparency of the switchable layer means 6.

The controlling means 14 comprises the touch screen 12 as touch sensitive system for realizing a switch function by touching the surface of the touch screen 12 for controlling and adjusting the transparency of the switchable layer means 6 and, therefore, also of the whole window, and a display function for indicating the presently adjusted or switched status of transparency of the switchable layer means 6. The touch screen 12 can be of the resistive or capacitive type.

The touch screen 12 displays a scale 12.1 for indicating the degree of transparency or darkening or blinding the window against sunlight from outside radiating the outer pane 8 of the window construction 1. The touch screen 12 is inserted in an opening 2.1 or recess provided in the inner pane 2 and it comprises the touch screen electrode layer 10 or pad being sensitive to mechanical touching of the touch screen 12 or its touch sensitive area 12.2 that is accessible to a person or passenger within a train or vehicle.

Further, the controlling means 14 comprises a controlling unit 15 or interface which can be realized as control box that is coupled to the touch screen 12 and to the touch screen electrode layer 10, to the switchable layer means 6 of the window glazing 9, and to a voltage supply 17 for supplying the required voltage or electrical energy. More detailed, the controlling means 14 provides a first wiring 13 for coupling the touch screen electrode layer 10 or panel to the controlling unit 15, and a second electrical wiring 16 for coupling the controlling unit 15 to the first controlling electrode layer 6.1 of the switchable layer means 6.

The controlling electrode layer 6.1 of the electrically switchable layer means 6 comprises six separated and individually and independently controllable electrode fields 30, 31, 32, 33, 34, and 35 that correspond to six individually and independently controllable darkening fields 20, 21, 22, 23, 24, and 25 or segments of the electrochromic layer 6.2 of the electrically switchable layer means 6. These darkening fields 20 to 25 are shown in FIG. 1 and they are nearly equal in area, stripe like, horizontal and parallel as shown by the auxiliary lines in FIG. 1.

Figure 4:
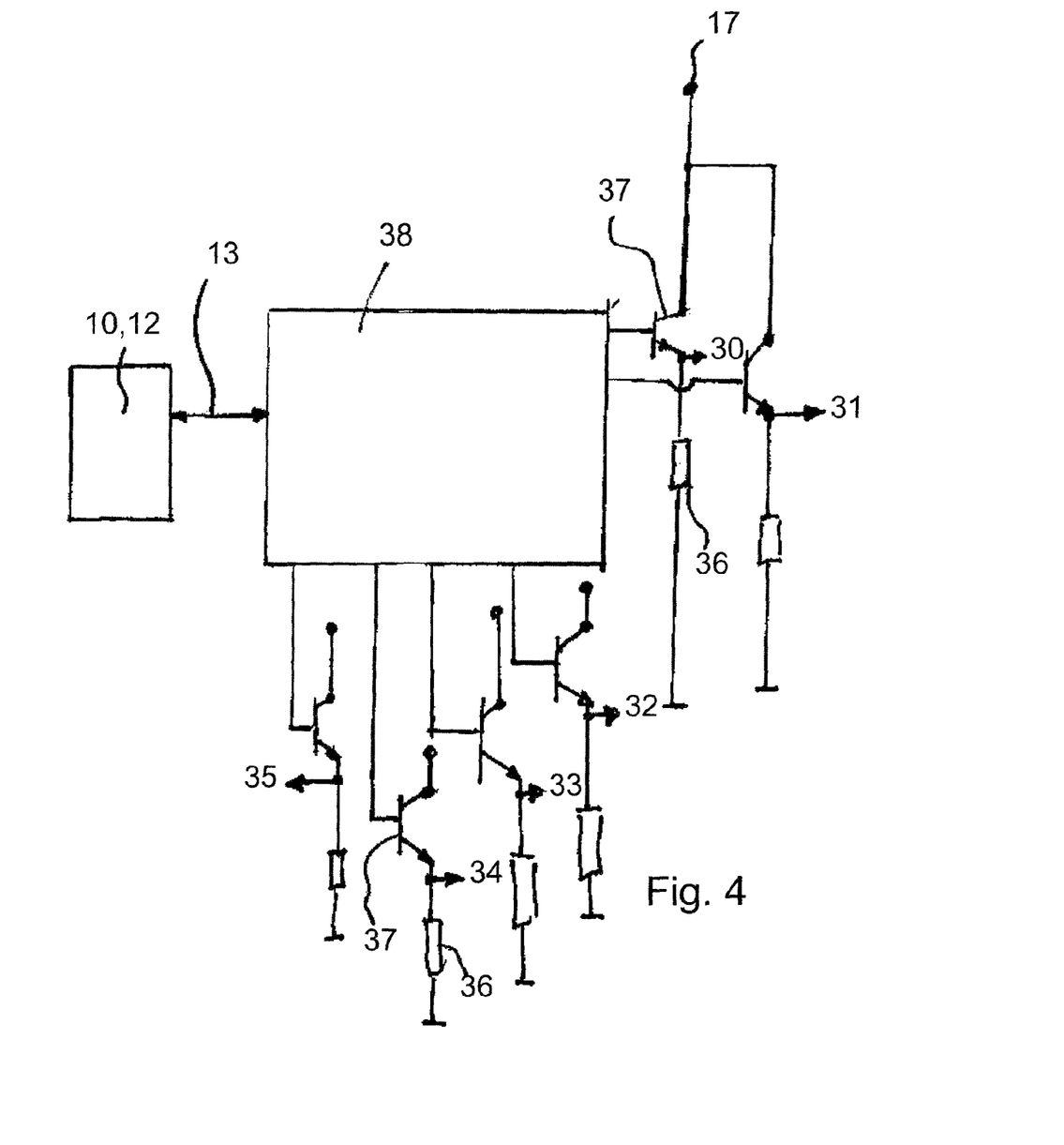
FIG. 4 a circuit diagram of controlling means that can be used in the embodiment of FIGS. 1 to 3 above.

FIG. 4 shows an electronic circuit diagram of the controlling unit 15 that comprises a microprocessor 38, a microcontroller, or even a microcomputer supported and controlled by software and six switching interface circuits having the same structure and comprising each a switch and/or voltage dimmer, for instance, a circuit with transistor 37 and resistor 36 for individually and selectively controlling the corresponding electrode fields 30 to 35 of the controlling electrode layer 6.1 of the switchable layer means 6 by the microprocessor 38. In alternative, the transistors 37 for controlling the switchable segments can be realized as relays or solid-state relays.

For instance, if a passenger wishes to make the darkening field 20 of the window glazing 9 transparent or more transparent, then he touches the touch screen 12 on the inner pane 2 accordingly. The microprocessor 38 of the controlling unit 15 in the controlling means 14 detects this action from the touch screen 12 via the touch screen electrode panel 10 and the first wiring 13 and controls the corresponding transistor 37 to be switched on. Then electrical current flows through this transistor 37 and the respective resistor 36 to mass and an increased voltage is supplied to the electrode field 30 corresponding to the darkening field 20 via the second wiring 16. If the high or increased voltage is supplied to the respective electrode field 30 then the electrochromic layer 6.2 changes is transparency within the corresponding darkening field 20 from approximately 0% to a higher transparency value, for instance, approximately 60% for sunlight which means that light then can pass through the electrochromic layer 6.2 within the darkening field 20 and a corresponding high transparency of the window construction 1 is effected within the darkening field 20.

For instance, if the passenger wishes a complete transparency, he can touch the touch screen 12 correspondingly to control all electro fields 30 to 35 and the corresponding darkening fields 20 to 25 of the window glazing 9 at the same time to change from the normally darkening state to a transparent or selected state or fully transparent state of the window construction 1. If the passenger wants to select only, for instance, the darkening fields 21 and 24 to make only these areas of the window construction 1 being transparent, he only has to operate the touch screen 12 correspondingly.

Figure 5:
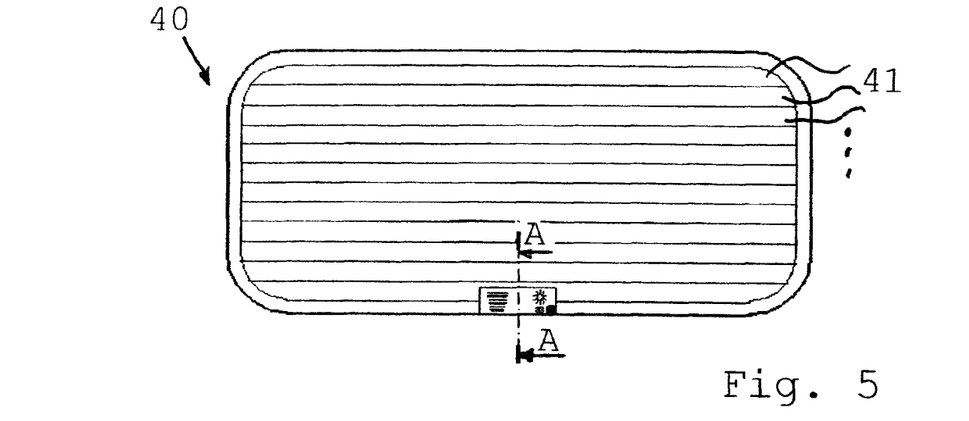
FIG. 5 a schematic view of a window construction according to a further embodiment of the present invention.
Figure 6:
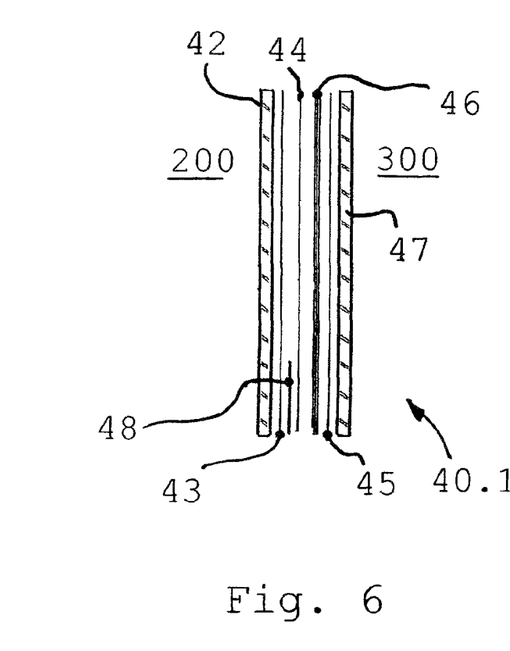
FIG. 6 a schematic view in part of a laminated and integrated window glazing used in the embodiment of the invention of FIG. 5 in cross section in an explosive manner along the auxiliary line AA in FIG. 5.
Figure 7:
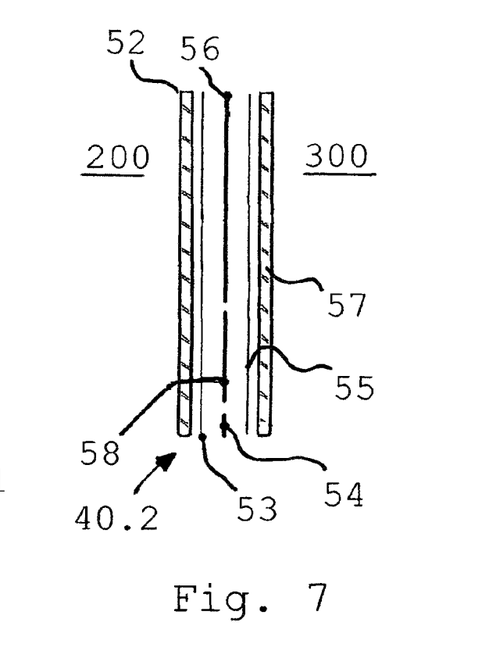
FIG. 7 a schematic view in part of a further laminated and integrated window glazing used in the embodiment of the invention of FIG. 5 in cross section in an explosive manner along the auxiliary line AA in FIG. 5.

FIGS. 5, 6, and 7 show a window construction 40 according to a further embodiment of the present invention. The window construction 40 has the usual shape of a rectangular window and it can be used, preferably, in a train, but also in another vehicle like a car or even a building. It is formed in an integrated laminate with a plurality of layers. The window construction or pane 40 can be a single laminate or be a part of an insulating glass unit.

FIG. 6 shows a schematic view in part of a laminated and integrated window glazing 40.1 of the window construction 40 in cross section in an explosive manner along the auxiliary line AA in FIG. 5.

The window glazing 40.1 comprises an inner transparent pane 42 made of glass or plastic like, for instance, polycarbonate (=PC), EVA or hard polyurethane, the inner pane 42 is directed to an inside 200 of a train or passenger compartment, a first transparent interlayer 43 being adhesive and made, for instance, of polyvinylbutyral (=PVB) or a PVB, PU or EVA foil, a touch sensitive panel 48 or touch screen of capacitive type as a touch sensitive system, a second adhesive transparent PVB, PU or EVA interlayer 44, wherein the touch sensitive panel 48 is arranged between the interlayers 43 and 44, electrically switchable layer means 46 comprising an electrically switchable film between electrode layers designed for a number of independent darkening fields 41, a third adhesive transparent PVB, PU or EVA interlayer 45, wherein the electrically switchable layer means 46 is arranged between the interlayers 44 and 45, and an outer pane 47 made of glass or plastic like PC, PMMA or hard polyurethane which adjoins the interlayer 45 and which is directed to an outside 300 of the train or vehicle in which the window construction 40 is used.

Further, the window construction 40 comprises controlling means equal or similar to the controlling means 14 of the embodiment shown in FIG. 3 that are coupled to the switchable layer means 46 for controlling the sunlight transparency of the switchable layer means 46 according to darkening fields 41 of the window construction 40 which are arranged horizontally as shown by auxiliary lines in FIG. 5.

FIG. 7 shows a schematic view in part of a laminated and integrated alternative window glazing 40.2 of the window construction 40 in cross section in an explosive manner along the auxiliary line AA in FIG. 5.

The laminated window glazing 40.2 has again a plurality of layers arranged parallel and it comprises an inner transparent pane 52 made of glass or plastic like, for instance, polycarbonate (=PC), PMMA or hard polyurethane, the inner pane 52 is directed to an inside 200 of a train or passenger compartment, a first transparent interlayer 53 being adhesive and made, for instance, of polyvinylbutyral (=PVB) or a PVB, PU or EVA foil, a touch sensitive panel 58 or touch screen of capacitive type, a second adhesive transparent PVB, PU or EVA interlayer 54, a third adhesive transparent PVB interlayer 55, electrically switchable layer means 56 comprising a switchable film with corresponding electrode layers designed for the plurality of independent darkening fields 41 arranged horizontally in parallel stripes, and an outer pane 57 made of glass or plastic like PC or hard polyurethane which adjoins the third interlayer 55 and which is directed to an outside 300 of the train or vehicle in which the window construction 40 is used.

The second interlayer 54, the touch sensitive panel 58, and the electrically switchable layer means 56 are arranged in the same plane between interlayers 53 and 55. The touch sensitive panel 58 is surrounded by the electrically switchable layer means 56 on three sides but adjoins the third interlayer 54 on its bottom side.

Further, the window construction 40 comprises controlling means equal or similar to the controlling means 14 of the embodiment shown in FIG. 3 which are electrically coupled to the switchable layer means 56 for controlling the sunlight transparency of the switchable layer means 46 according to the darkening fields 41 of the window construction 40 which are arranged horizontally as shown in FIG. 5 with auxiliary lines.

Figure 8:
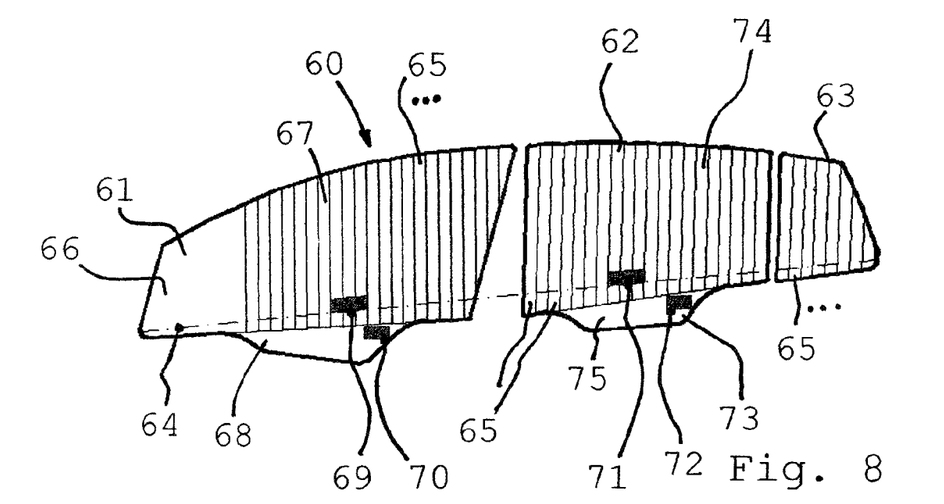
FIG. 8 a schematic view of a yet further window construction according to a further embodiment of the present invention to be used in a car.
Figure 9:
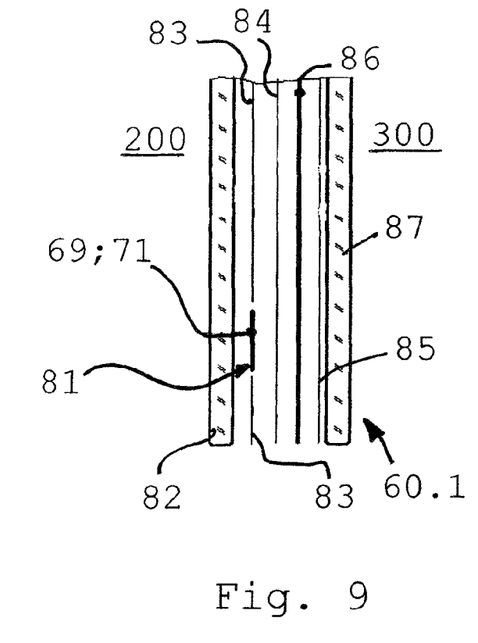
FIG. 9 a schematic view in part of a laminated and integrated window glazing used in the embodiment of the invention of FIG. 8 in cross section in an explosive manner.
Figure 10:
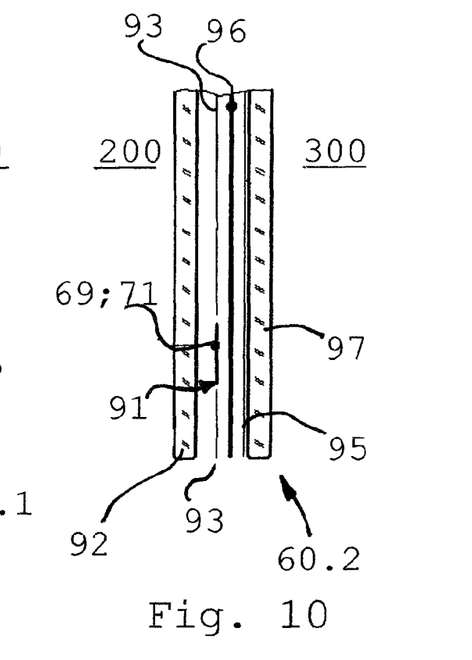
FIG. 10 a schematic view in part of a further laminated and integrated window glazing used in the embodiment of the invention of FIG. 8 in cross section in an explosive manner.

FIGS. 8, 9, and 10 show a window construction 60 according to a further embodiment of the present invention to be used in car. The window construction 60 comprises a complete window set on the right side of a car and the set comprises a moveable front door window 61, a moveable rear door window 62, and a fixed quarterlight window 63 as shown in extracted manner in FIG. 8. A car body line 64 on the right side of the car body is illustrated by the auxiliary line in FIG. 8. Each of the windows 61, 62, and 63 is formed in an integrated laminate with a plurality of layers and comprises a plurality of vertical darkening fields 65 or segments that are arranged in parallel stripes with substantially the same width.

The front door window 61 is divided in a front part 66, a back part 67, which both are visible, and a lower part 68 that is arranged within the front door of the car substantially under the car body line 64 and, therefore, it is not visible. The front door window 61 has a plurality of darkening fields 65 only in the back part 67 of the front door window 61, whereas the front part 66 and the lower part 68 of the front door window 61 are free of darkening fields. The darkening fields 65 of the front door window 61 are arranged vertically and in parallel to each other as shown in FIG. 8.

The front door window 61 also comprises a touch screen 69 or a touch sensitive panel for controlling the function of the darkening fields 65 of the front door window 61 by a passenger in the car, and corresponding electrical controlling means 70 that are coupled to the touch screen 69, a power supply for supplying electrical energy, and to an electrically switchable layer means 86 or switchable film within the front door window 61. The controlling means 70 or control box is installed within the lower part 70 of the front door window 61.

The back door window 62 is divided in an upper part 74 that is substantially above the car body line 64 and that is visible and a lower part 68 that is arranged within the back door of the car substantially under the car body line 64 and, therefore, it is not visible. The back door window 62 has a plurality of darkening fields 65 only in its upper part 74, whereas its lower part 75 is free of darkening fields. The darkening fields 65 of the back door window 62 are again arranged vertically and in parallel to each other as shown in FIG. 8.

The back door window 62 also comprises a touch screen 71 or touch sensitive panel for controlling the transparency or darkening function of its darkening fields 65 by a passenger in the car, and corresponding electrical controlling means 72 that are coupled to the touch screen 71, the power supply for supplying electrical energy, and to an electrically switchable layer means 86 or 96 or switchable film within the back door window 62 and also within the quarterlight window 63. The controlling means 72 or control box is installed within or on the lower part 73 of the back door window 62.

The quarterlight window 63 has also a plurality of darkening fields 65 that are again arranged vertically and in parallel to each, have the same width, and extend vertically along the whole window as shown in FIG. 8 by the auxiliary lines. The darkening fields 65 of the quarterlight window 63 are controlled by means of the touch screen 71 of the back door window 62.

FIG. 9 shows a schematic view in part of a laminated and integrated window glazing 60.1 of the window construction 60 in cross section in an explosive manner through the touch screen 69 of the front door window 61 or through the touch screen 71 of the back door window 62.

The window glazing 60.1 comprises an inner transparent pane 82 made of glass or plastic like, for instance, polycarbonate (=PC), PMMA or hard polyurethane, the inner pane 82 is directed to an inside 200 of a car or passenger compartment, a first transparent interlayer 83 being adhesive and made, for instance, of polyvinyl butyral (=PVB) or a PVB, PU or EVA foil, a touch screen 69 or 71 or touch sensitive panel of capacitive type, a second adhesive transparent PVB, PU or EVA interlayer 84, wherein the touch sensitive panel 69 or 71 is arranged within a a corresponding opening 81 of the interlayer 83 which means that the touch screen 69 or 71 is surrounded by the interlayer 83 in the same plane, electrically switchable layer means 86 comprising an electrically switchable film between electrode layers designed for the plurality of independent controllable darkening fields 65, a third adhesive transparent PVB, PU or EVA interlayer 85, wherein the electrically switchable layer means 86 is arranged between the interlayers 84 and 85, and an outer pane 87 made of glass or plastic like PC, PMMA or hard polyurethane which adjoins the interlayer 85 and which is directed to an outside 300 of the car in which the window construction 60 is used.

FIG. 10 shows a schematic view in part of an alternative laminated and integrated window glazing 60.2 of the window construction 60 in cross section in an explosive manner through the touch screen 69 of the back door window 61 or through the touch screen 71 of the back door window 62.

The window glazing 60.2 comprises an inner transparent pane 92 made of glass or plastic like, for instance, polycarbonate (=PC), PMMA or hard polyurethane, the inner pane 92 is directed to an inside 200 of a car or passenger compartment, a first transparent interlayer 93 being adhesive and made, for instance, of polyvinyl butyral (=PVB), PU or EVA or a PVB foil, a touch screen 69 or 71 or touch sensitive panel of capacitive type, wherein the touch screen 69 or 71 is arranged within a a corresponding opening 91 of the interlayer 93 which means again that the touch screen 69 or 71 is surrounded by the interlayer 93 in the same plane, electrically switchable layer means 96 comprising an electrically switchable film between electrode layers designed for the plurality of independent controllable darkening fields 65, a second adhesive transparent PVB, PU or EVA interlayer 95, wherein the electrically switchable layer means 96 is arranged between the interlayers 93 and 95, and an outer pane 97 made of glass or plastic like PC, PMMA or hard polyurethane which adjoins the interlayer 95 and which is directed to an outside 300 of the car in which the window construction 60 is used.

FIGS. 11, 12, 13, 14, 15, and 17 show a window construction 100 according to a further embodiment of the present invention. The window construction 100 has the usual shape of a rectangular window and it is an insulating window that can be used, preferably, in a train, but also in another vehicle like a car, ship, helicopter or aircraft, or even in a building. It is formed in an integrated laminate with a plurality of layers and panes.

Figure 11:
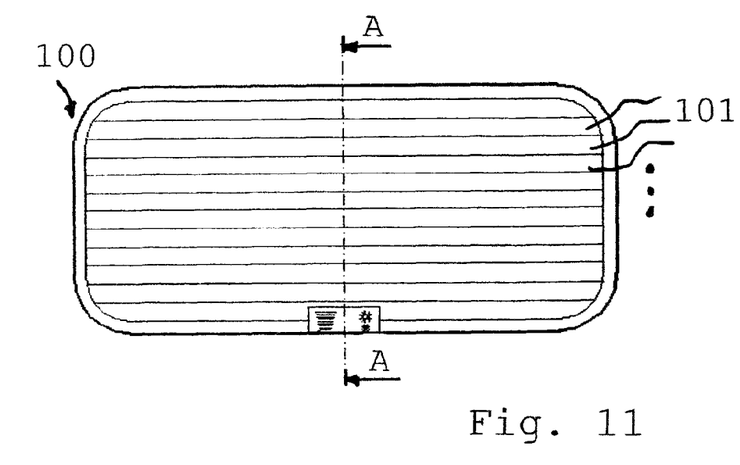
FIG. 11 a schematic view of a yet further window construction according to a further embodiment of the present invention to be used in an insulating panel.
Figure 12:
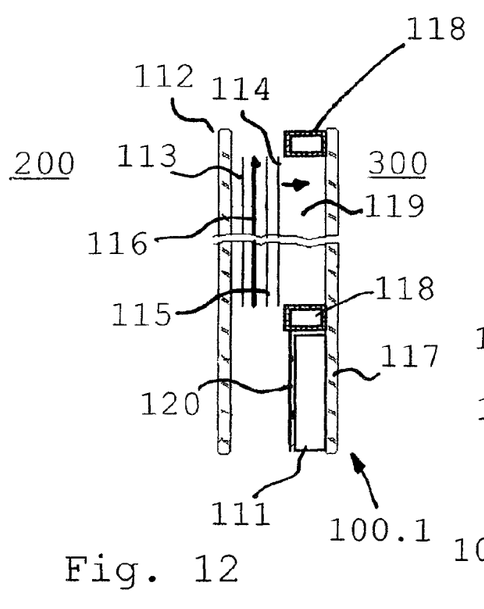
FIG. 12 a schematic view in part of a first laminated and integrated window glazing used in the embodiment of the invention of FIG. 11 in cross section in an explosive manner along the line AA in FIG. 11.

FIG. 12 shows a schematic view in part of a laminated and integrated window glazing 100.1 of the insulating window construction 100 in cross section in an explosive manner along the auxiliary line AA in FIG. 11.

The window glazing 100.1 comprises an inner transparent pane 112 made of glass or plastic like, for instance, polycarbonate (=PC), PMMA or hard polyurethane, the inner pane 112 is directed to an inside 200 of a train or passenger compartment, a first transparent interlayer 113 or film being adhesive and made, for instance, of polyvinyl butyral (=PVB), PU or EVA or a PVB foil, a capacitive touch sensitive panel 120 or touch screen, a second adhesive transparent PVB, PU or EVA interlayer 115, electrically switchable layer means 116 comprising an electrically switchable film between electrode layers designed for a plurality of independent darkening fields 101, a transparent protection layer 114, wherein the electrically switchable layer means 116 is arranged between the interlayers 113 and 115, and an outer pane 117 made of glass or plastic like PC or hard polyurethane which is directed to an outside 300 of the train or vehicle in which the window construction 100 is used.

Further, the window construction 100 comprises controlling means 111 or a corresponding control box equal or similar in function and construction like the controlling means 14 of the embodiment shown in FIG. 3 which are electrically coupled to the switchable layer means 116 for controlling its sunlight transparency according to the darkening fields 101 or segments of the window construction 100 which are arranged horizontally as shown in FIG. 11 by the auxiliary lines.

As being an insulating window, the window glazing 100.1 has a circumferential insulating spacer profile 118 in the shape of an inner frame extending between the inner pane 112 and the outer pane 117 and surrounding an insulating gap 119 or insulating air space. The interlayers 113 and 115, the electrically switchable layer means 116 and the protection layer 114 are arranged within the insulating gap 119, whereas the controlling means 111 and the touch sensitive panel 120 or touch screen are arranged outside of the insulating gap 119 and the spacer profile 118 between the inner and outer panes 112 and 117 at a lower edge of the window glazing 100.1 below the insulating spacer profile 118.

Figure 13:
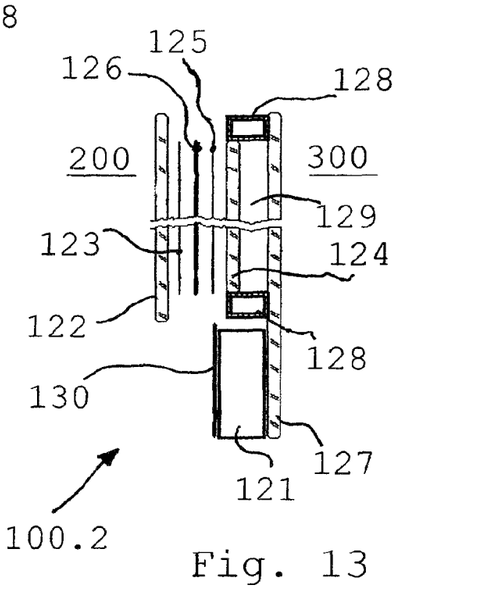
FIG. 13 a schematic view in part of a second laminated and integrated window glazing used in the embodiment of the invention of FIG. 11 in cross section in an explosive manner along the line AA in FIG. 11.

FIG. 13 shows a schematic view in part of a laminated and integrated window glazing 100.2 of the insulating window construction 100 in cross section in an explosive manner along the auxiliary line AA in FIG. 11.

The window glazing 100.2 comprises an inner transparent pane 122 made of glass or plastic like, for instance, polycarbonate (=PC), PMMA or hard polyurethane, the inner pane 122 is directed to an inside 200 of a train or passenger compartment, a first transparent interlayer 123 or film being adhesive and made, for instance, of polyvinyl butyral (=PVB), PU or EVA or a PVB foil, a capacitive touch sensitive panel 130 or touch screen, a second adhesive transparent PVB interlayer 125, electrically switchable layer means 126 comprising an electrically switchable film between electrode layers designed for a plurality of independent darkening fields 101, a middle transparent pane 124 made of glass or plastic like polycarbonate (=PC), PMMA or hard polyurethane, the middle pane 124 adjoining the adhesive interlayer 125, wherein the electrically switchable layer means 126 is arranged between the interlayers 123 and 125, and an outer transparent pane 127 made of glass or plastic like PC, PMMA or hard polyurethane which is directed to an outside 300 of the train or vehicle in which the window construction 100 is used.

Further, the window construction 100 comprises controlling means 121 or a corresponding control box equal or similar in function and construction like the controlling means 14 of the embodiment shown in FIG. 3 which are electrically coupled to the switchable layer means 126 for controlling its sunlight transparency according to the darkening fields 101 or segments of the window construction 100 which are arranged horizontally as shown in FIG. 11, to the touch sensitive panel 130 or touch screen, and to a power supply 157.

As being an insulating window, the window glazing 100.2 has a circumferential insulating spacer profile 128 in the shape of an inner frame extending between the inner pane 122 and the outer pane 127. The middle pane 124 that is arranged in parallel to the outer pane 127 and that is vertically shorter than the outer pane 127, and the insulating spacer profile 128 surround and define an air gap 129 or insulating space. The inner pane 122 is flush to the spacer profile 128 or frame. The interlayers 123 and 125, and the electrically switchable layer means 126 arranged there between are flush to the middle pane 124 and they are arranged within the inner pane and the middle pane in a laminate. The inner and outer panes 122 and 127 are flush at an upper edge of the window glazing 100.2.

The controlling means 121 and the touch sensitive panel 130 or touch screen are arranged outside of the air gap 129 and of the spacer profile 128 at a lower edge of the window glazing 100.2 below the insulating spacer profile 128, and they are arranged and fixed on an inside of the outer pane 127.

Figure 14:
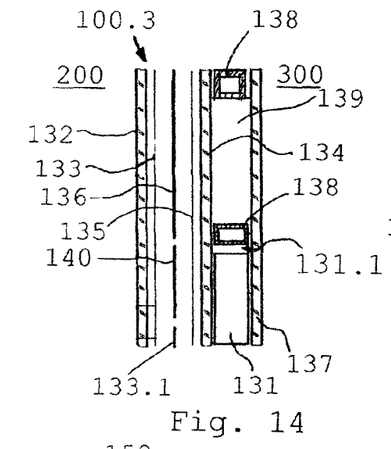
FIG. 14 a schematic view in part of a third laminated and integrated window glazing used in the embodiment of the invention of FIG. 11 in cross section in an explosive manner along the line AA in FIG. 11.

FIG. 14 shows a schematic view in part of a laminated and integrated window glazing 100.3 of the insulating window construction 100 in cross section in an explosive manner along the auxiliary line AA in FIG. 11.

The window glazing 100.3 comprises an inner transparent pane 132 made of glass or plastic like, for instance, polycarbonate (=PC) or hard polyurethane, the inner pane 132 is directed to an inside 200 of a train or passenger compartment, a first transparent interlayer 133 or film being adhesive and made, for instance, of polyvinyl butyral (=PVB), PU or EVA or a PVB foil, a capacitive touch sensitive panel 140 or touch screen, a second adhesive transparent PVB, PU or EVA interlayer 135, electrically switchable layer means 136 comprising an electrically switchable film between electrode layers designed for a plurality of independent darkening fields 101, a middle transparent pane 134 made of glass or plastic like polycarbonate (=PC), PMMA or hard polyurethane, the middle pane 134 adjoining the adhesive interlayer 135, wherein the electrically switchable layer means 136, the touch sensitive panel 140 or touch screen, and a further adhesive PVB, PU or EVA interlayer 133.1 are arranged within the same plane and between the interlayers 133 and 135, wherein the touch sensitive panel 140 is arranged in an opening of the further interlayer 133.1 and surrounded by it, and an outer transparent pane 137 and a middle transparent pane 134 made of glass or plastic like PC, PMMA or hard polyurethane. The outer pane 137 is directed to an outside 300 of the train or vehicle in which the window construction 100 is used. The panes 132, 134, and 137 are flush, have the same shape, and are parallel to each other.

Further, the window construction 100 comprises controlling means 131 or a corresponding control box equal or similar in function and construction like the controlling means 14 of the embodiment shown in FIG. 3 which are electrically coupled to the switchable layer means 136 for controlling its sunlight transparency according to the darkening fields 101 or segments of the window construction 100 which are arranged horizontally as shown in FIG. 11, to the touch sensitive panel 140 or touch screen, and to a power supply.

As being an insulating window, the window glazing 100.3 has a circumferential insulating spacer profile 138 in the shape of an inner frame extending between the middle pane 134 and the outer pane 137. The middle pane 134, the outer pane 137, and the insulating spacer profile 138 surround and define an air gap 139 or insulating space there between. The switchable layer means 136 or foil is flush to the insulating spacer means 138.

The controlling means 131 and the touch sensitive panel 140 or touch screen are arranged outside of the insulating air gap 139 and outside of the spacer profile 138 at a lower edge of the window glazing 100.3 below the insulating spacer profile 138, and between the middle and outer panes 134, 137 in a free space 131.1, and they are arranged on the outer pane 137 and/or the middle pane 134. The touch sensitive panel 140 is arranged on the controlling means 131 in the form of a control box.

Figure 15:
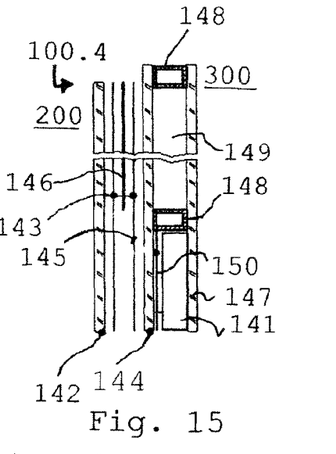
FIG. 15 a schematic view in part of a forth laminated and integrated window glazing used in the embodiment of the invention of FIG. 11 in cross section in an explosive manner along the line AA in FIG. 11.

FIG. 15 shows a schematic view in part of an alternative laminated and integrated window glazing 100.4 of the insulating window construction 100 in cross section in an explosive manner along the auxiliary line AA in FIG. 11.

The window glazing 100.4 comprises an inner transparent pane 142 made of glass or plastic like, for instance, polycarbonate (=PC), PMMA or hard polyurethane, the inner pane 142 is directed to an inside 200 of a train or passenger compartment, a first transparent interlayer 143 or film being adhesive and made, for instance, of polyvinyl butyral (=PVB), PU or PMMA or a PVB foil, a capacitive touch sensitive panel 150 or touch screen, a second adhesive transparent PVB, PU or EVA interlayer 145, electrically switchable layer means 146 comprising an electrically switchable film between electrode layers designed for a plurality of independent darkening fields 101, a middle transparent pane 144 made of glass or plastic like polycarbonate (=PC) or hard polyurethane, the middle pane 144 adjoining the adhesive interlayer 145, wherein the electrically switchable layer means 146 is arranged between the interlayers 143 and 145, and an outer transparent pane 147 that is directed to an outside 300 of the train or vehicle in which the window construction 100 is used. The panes 142, 144, and 147 are flush, have the same shape, and are parallel to each other.

Further, the window construction 100 comprises controlling means 141 or a corresponding control box equal or similar in function and construction like the controlling means 14 of the embodiment shown in FIG. 3 which are electrically coupled to the switchable layer means 146 for controlling its sunlight transparency according to the darkening fields 101 or segments of the window construction 100 which are arranged horizontally as shown in FIG. 11, to the touch sensitive panel 150 or touch screen, and to a power supply.

As being an insulating window, the window glazing 100.4 has a circumferential insulating spacer profile 148 in the shape of an inner frame extending between the middle pane 144 and the outer pane 147. The middle pane 144, the outer pane 147, and the insulating spacer profile 148 surround and define an air gap 149 or insulating space there between. The switchable layer means 146 or foil is flush to the insulating spacer means 148.

The controlling means 141 and the touch sensitive panel 150 or touch screen are arranged outside of the air gap 149 and outside of the spacer profile 148 at a lower edge of the window glazing 100.4 below the insulating spacer profile 148, and between the middle and outer panes 144, 147. The touch panel 150 or touch screen is arranged between the middle pane 144 and the controlling means 141 or control box.

Figure 16:
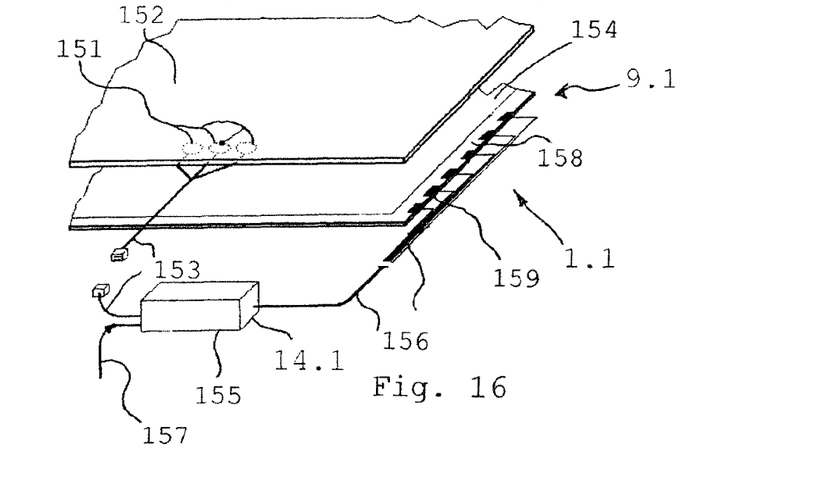
FIG. 16 a schematic perspective and explosive view in part of a window construction of the invention using a printed structure or circuit as touch sensitive panel or in a touch screen.

FIG. 16 shows a perspective and exploded view of a part of a further window construction 1.1 according to an alternative embodiment of the present invention. The window construction 1.1 has the usual shape of a rectangular window and it can be used, preferably, in a train, but also in another vehicle like a car or even a building. It is formed in an integrated laminate with a plurality of layers.

The window construction 1.1 comprises a laminated and integrated window glazing 9.1 that comprises an inner pane 152 made of glass or plastic like, for instance, polycarbonate (=PC), PMMA or hard polyurethane, the inner layer is directed to an inside of a train or passenger compartment, an interlayer 154 being adhesive and made, for instance, of polyvinylbutyral (=PVB), PU or PMMA or a PVB foil, a touch sensitive structure 151 as touch sensitive system or touch panel, electrically switchable layer means 158 or a switchable film having a plurality of electrical contacts 159, each coupled to one of the darkening fields 101.

Further, the window construction 1.1 comprises controlling means 155 or a control box that are coupled to the switchable layer means 158 of the window glazing 9.1 for controlling the sunlight transparency of the switchable layer means 158.

The controlling means 155 comprises the touch sensitive structure 151 for realizing a switch function by touching the surface of the touch sensitive structure 151 for controlling and adjusting the transparency of the switchable layer means 158 according to the independently switchable darkening fields 101 and, therefore, also of the whole window. The touch sensitive structure 151 is a printed circuit that is disposed by a printing method on a surface of the inner pane 152, on the surface of the adhesive interlayer 154, or, generally, on a surface of a layer made of glass, plastic like PVB, PC, hard polyurethane, or acrylic glass. The printed structure can comprise one or more circles, stripes, spirals, coils, capacities, or resistances or contact pads. The printed structures can be made of metallic paste printed on the surface. The touch sensitive structure 151 can be used as a touch sensitive panel or in a touch screen in each of the embodiments according to FIGS. 1, 6, 7, 9, 10, 12, 13, 14, 15, and 17.

Further, the controlling means 14.1 comprises a controlling unit 155 or interface that is coupled to the touch sensitive structure 151, to the switchable layer means 158 of the window glazing 9.1, and to a voltage supply 157 for supplying the required voltage or electrical energy. More detailed, the controlling means 14.1 provides a first wiring 153 for coupling the touch sensitive structure 151 or panel to the controlling unit 155, and a second electrical wiring 156 for coupling the controlling unit 155 or controlling box to the contacts 159 of the switchable layer means 158.

Figure 17:
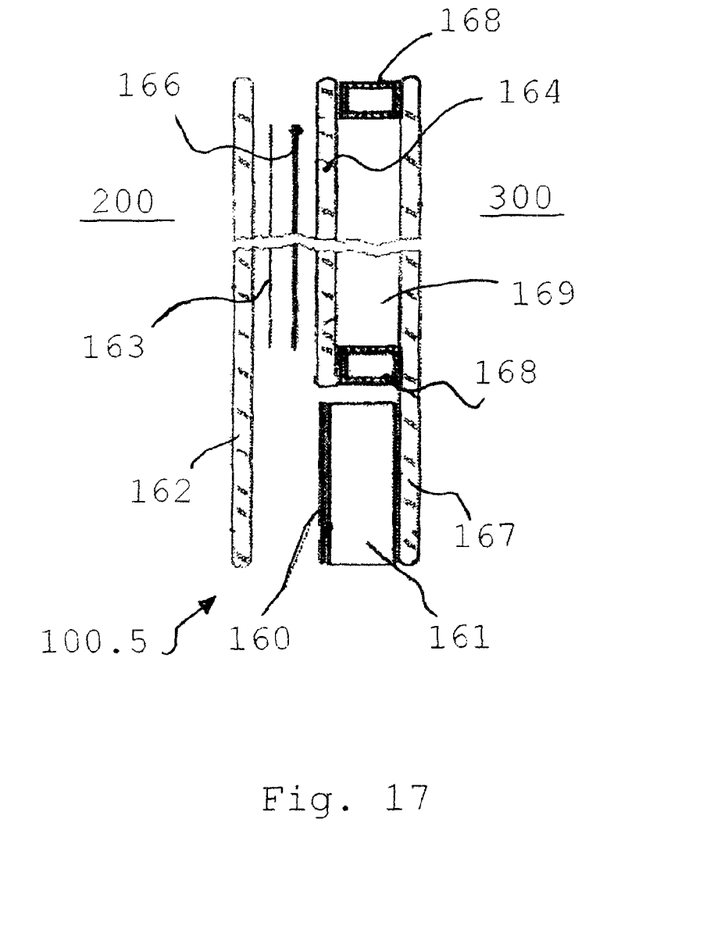
FIG. 17 a schematic view in part of a fifth laminated and integrated window glazing used in the embodiment of the invention of FIG. 11 in cross section in an explosive manner along the line AA in FIG. 11.

FIG. 17 shows a schematic view in part of a further alternative laminated and integrated window glazing 100.5 of the insulating window construction 100 in cross section in an explosive manner along the auxiliary line AA in FIG. 11.

The window glazing 100.5 comprises an inner transparent pane 162 made of glass or plastic like, for instance, PC, PMMA or hard polyurethane, the inner pane 162 is directed to an inside 200 of a train or passenger compartment, a first transparent interlayer 163 or film being adhesive and made, for instance, of PVB, PU or EVA or a corresponding foil, a capacitive touch screen 160 or touch sensitive panel, electrically switchable layer means 166 comprising an electrically switchable film between electrode layers designed for a plurality of independent darkening fields 101, a middle transparent pane 164 made of glass or plastic like PC, PMMA or hard polyurethane, a further adhesive interlayer made of PVB, PU or EVA can be arranged between the electrically switchable layer means 166 and the middle pane 164, wherein the electrically switchable layer means 166 adjoins the the interlayer 163, and an outer transparent pane 167 made of glass or plastic like PC, PMMA or hard polyurethane which is directed to an outside 300 of the train or vehicle in which the window construction 100 is used.

Further, the window construction 100 comprises controlling means 161 or a corresponding control box equal or similar in function and construction like the controlling means 14 of the embodiment shown in FIG. 3 which are electrically coupled to the switchable layer means 166 for controlling its sunlight transparency according to the darkening fields 101 or segments of the window construction 100, the fields 101 are arranged horizontally as shown in FIG. 11, to the touch screen 130 or sensitive panel, and to a power supply 157.

As being an insulating window, the window glazing 100.5 has a circumferential insulating spacer profile 168 in the shape of an inner frame extending between the middle pane 164 and the outer pane 167. The middle pane 164 is flush to the periphery of the spacer profile 168, it is arranged in parallel to the outer pane 167 and the middle pane 164 is vertically shorter than the outer pane 167. The insulating spacer profile 168 surrounds and defines an air gap 169 or insulating space. The inner pane 162 is flush to the outer pane 167. The interlayer 163 and the electrically switchable layer means 166 are flush to an inside circumference of the spacer profile 128 and they are arranged between the inner pane 162 and the middle pane 164 in a laminate. The inner and outer panes 162 and 167 are flush at upper and lower edges of the window glazing 100.5.

The controlling means 161 or control box and the touch screen 160 or touch sensitive panel are arranged outside of the air gap 169 and of the spacer profile 168 at a lower edge of the window glazing 100.5 below the insulating spacer profile 168, and they are arranged and fixed on an inside of the outer pane 167. The touch screen 160 is arranged on the control box and is parallel to the inner and outer panes 162 and 167 and in the space there between.

In an example, each of the panes 162, 164, and 167 or glass panes can have a thickness of ca. 4 mm. The thickness of the adhesive intermediate layer 163 can be ca. 0.75 mm and the thickness of the switchable layer 166 can be ca. 1 mm. The thickness of the insulating spacer profile 168 can amount to ca. 10 mm. Accordingly, the thickness of the window glazing 100.5 can be approximately 23.75 mm.

The invention claimed is:

1. Window construction, particularly to be used in a train, vehicle, car, helicopter, aircraft or building, which comprises a laminated window glazing having electrically switchable layer means arranged in a laminate, and controlling means being coupled to the switchable layer means for controlling the sunlight transparency of the switchable layer means, wherein the controlling means comprises at least a display for indicating a presently adjusted or switched status of transparency of the window glazing or of the switchable layer means, and/or at least a switch to be operated by a person or passenger for controlling the transparency of the window glazing or switchable layer means, wherein the controlling means comprises a touch sensitive system or touch sensitive panel for realizing the switch or a touch screen for realizing the switch and the display, and wherein the controlling means comprises a controlling unit or interface electrically coupled to the touch sensitive panel or system or touch screen, the switchable layer means of the window glazing, and to a voltage supply, the window construction comprising a first wiring for coupling the touch sensitive panel or system or the touch screen to the controlling unit, wherein the first wiring is arranged on or within the window glazing, and/or a second wiring for coupling the controlling unit to the switchable layer means, wherein the second wiring is arranged on or within the window glazing.

2. Window construction according to claim 1, characterized in that the controlling means is arranged at least partly on or within the window glazing.

3. Window construction according to claim 1, characterized in that the the touch sensitive panel or system or touch screen is accessible inside of a vehicle or building or passenger compartment.

4. Window construction according to claim 3, characterized in that the touch sensitive panel or system or touch screen is arranged on or in the window glazing.

5. Window construction according to claim 3, characterized in that the switchable layer means and the touch sensitive panel, touch sensitive system, or touch screen are in the same layer plane.

6. Window construction according to claim 1, characterized in that the controlling unit is arranged on or within the window glazing.

7. Window construction according to claim 1, characterized in that the window glazing comprises a wiring layer comprising the first and second wirings.

8. Window construction according to claim 1, characterized in that the laminated window glazing comprises panes, made of glass or plastic selected from polycarbonate, PMMA or hard polyurethane, and interlayers made of an adhesive foil selected from a polyvinylbutyral or polyurethane or EVA foil, and the electrical switchable layer means comprises at least a first electrode layer, a second electrode layer, and an electrochromic layer arranged between the first and second electrode layers, and wherein the first electrode layer is portioned into a plurality of electrode fields corresponding to respective darkening fields or segments which are separately and independently controllable electrically by the controlling means, and that the second electrode layer is the common electrode coupled to electrical reference potential.

9. Window construction according to claim 8, characterized in that the electrode fields and corresponding darkening fields are formed in stripes vertically or horizontally arranged.

10. Window construction according to claim 1, characterized in that a controlling unit of the controlling means is installed in a free space between panes of the window glazing.

11. Window construction according to claim 1, characterized in that the window glazing comprises an insulating gap or insulating space like in an insulating window which is defined by two parallel panes made of glass or plastic, and an insulating spacer profile circumferentially extending in the form of a frame between the panes.

12. Window construction, particularly to be used in a train, vehicle, car, helicopter, aircraft or building, which comprises a laminated window glazing having electrically switchable layer means arranged in a laminate, and controlling means being coupled to the switchable layer means for controlling the sunlight transparency of the switchable layer means, wherein the controlling means comprises at least one display for indicating a presently adjusted or switched status of transparency of the window glazing or of the switchable layer means, and/or at least one switch to be operated by a person or passenger for controlling the transparency of the window glazing or switchable layer means, and wherein the controlling means comprises a touch sensitive system or touch sensitive panel for realizing the switch and the display, the touch sensitive panel or system or touch screen is accessible inside of a vehicle or building or passenger compartment, wherein the touch sensitive panel or system or touch screen comprises a printed structure or circuit.

\* \* \* \* \*